United States Patent [19]

Forsberg

[11] 4,351,627
[45] Sep. 28, 1982

[54] DEVICE WITH SCREW CONVEYOR FOR DISCHARGING BULK MATERIAL

[76] Inventor: Georg L. K. Forsberg, Nylandsgatan 14, 654 65 Karlstad, Sweden

[21] Appl. No.: 144,943

[22] Filed: Apr. 29, 1980

Related U.S. Application Data

[63] Continuation-in-part of Ser. No. 845,838, Oct. 26, 1977, abandoned.

[30] Foreign Application Priority Data

Oct. 26, 1976 [SE]  Sweden ................................ 7611862

[51] Int. Cl.³ ............................................. B65G 65/46
[52] U.S. Cl. ..................................... 414/312; 198/658; 414/310
[58] Field of Search ...................... 414/310, 312, 523; 222/404; 198/658

[56] References Cited

U.S. PATENT DOCUMENTS

| | | | |
|---|---|---|---|
| 2,933,175 | 4/1960 | Gray | 198/579 |
| 3,212,652 | 10/1965 | Roberts | 414/310 |
| 3,434,605 | 3/1969 | Yung | 414/310 |
| 3,647,094 | 3/1972 | Jackson | 414/312 |

FOREIGN PATENT DOCUMENTS 1087407 10/1967  United Kingdom ................ 414/310

Primary Examiner—Robert G. Sheridan
Attorney, Agent, or Firm—Cushman, Darby & Cushman

[57] ABSTRACT

A device for discharging bulk material so as to effect uniform descent of the bulk material. A rotary screw conveyor is surrounded by an elongated drum, the drum and the screw conveyor being rotated independently of each other and mounted for movement together in a straight line path perpendicular to the axis of rotation of the screw conveyor and drum. The drum is prevented from detrimental deflection during long periods of non-use, and is easy to start up after such long periods of non-use.

28 Claims, 12 Drawing Figures

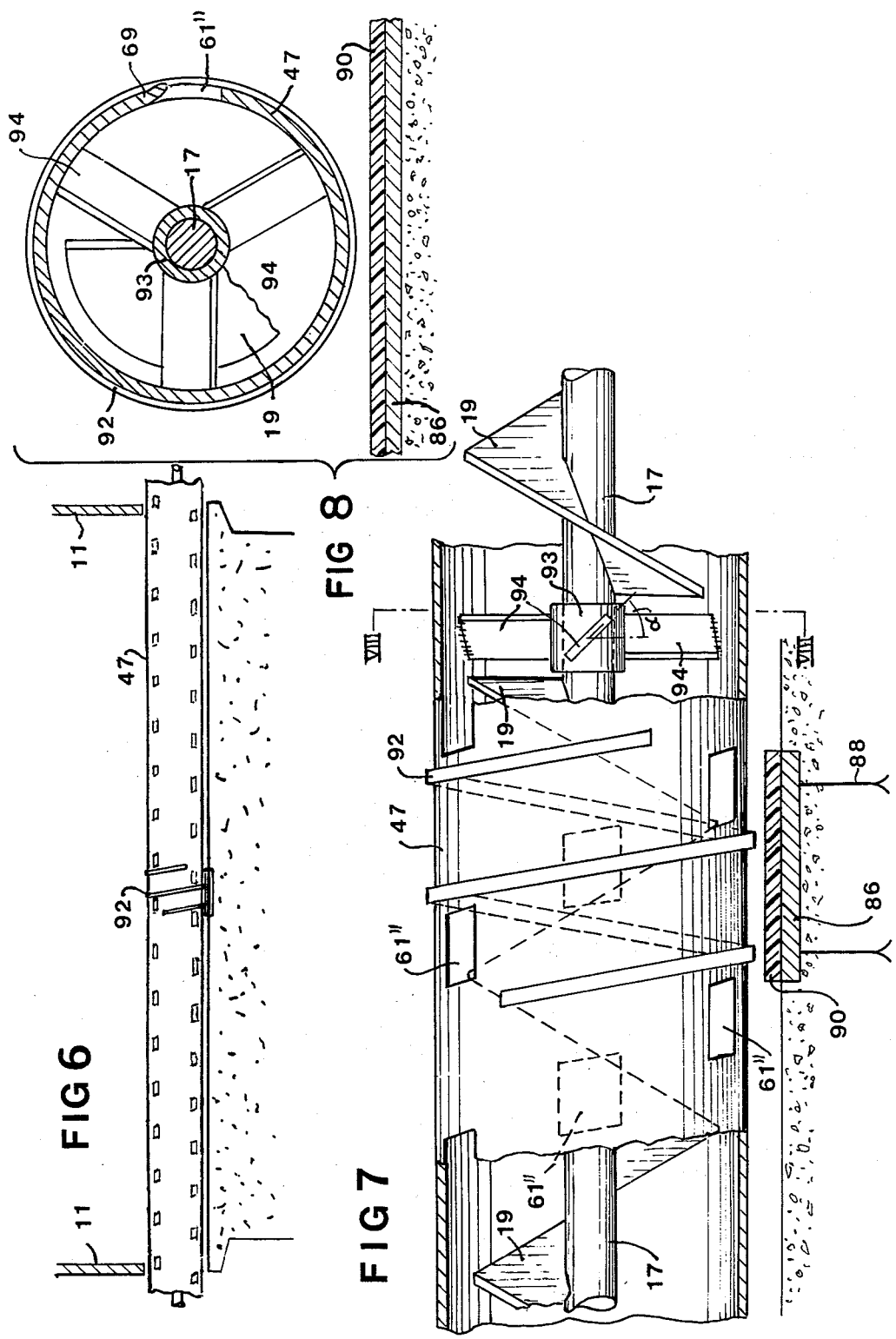

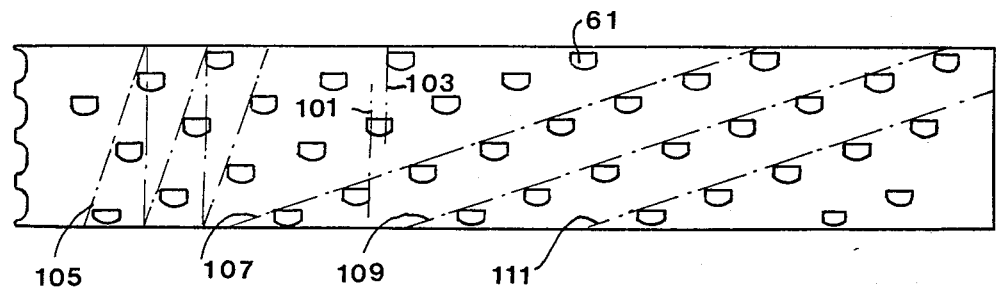
FIG 10
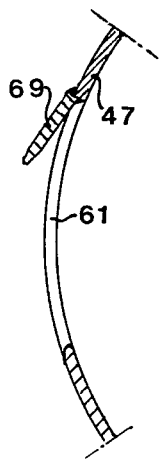
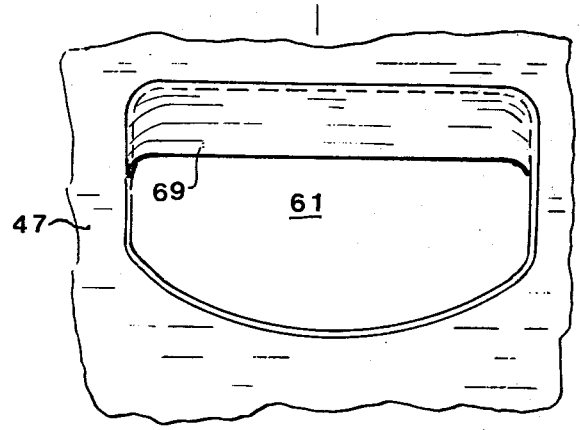
FIG 11
FIG 12
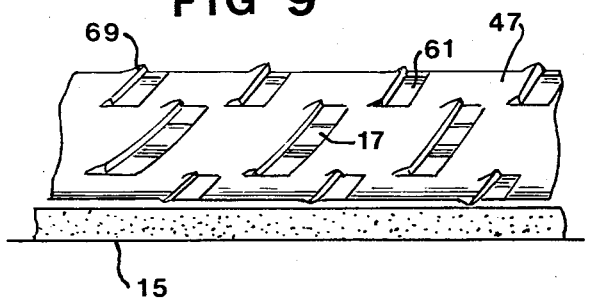
FIG 9

DEVICE WITH SCREW CONVEYOR FOR DISCHARGING BULK MATERIAL

CROSS REFERENCE TO RELATED APPLICATIONS

This application is a continuation-in-part of application Ser. No. 845,838 filed Oct. 26, 1977, now abandoned.

BACKGROUND AND SUMMARY OF THE INVENTION

The invention relates to a device for discharging bulk material from a store thereof. The bulk material comprises solid material divided into small particles, such as grains, powder or the like. The bulk material does not flow easily by itself but must be provided with some mechanical aid. Examples of bulk material with which the invention is particularly suited include wood chips, corn, sand, and coal.

In the past, discharging of bulk material from a store thereof is rarely accomplished uniformly. Rather, different horizontal layers of the bulk material become intermixed. The intermixing of layers, and the existence of some of the stored material in a storage vessel for significantly longer periods of time than the average material, has many disadvantages when the bulk material is ultimately utilized.

In one form of prior art device, a rotatable drum is provided having an end portion thereof mounted for rotational movement about an axis substantially at the center of the store of bulk material. The drum has teeth and openings evenly distributed along the length thereof. As the central part of the bottom of the bulk material is acted upon by more teeth in a given period of time than the peripheral locations of the bulk material, the material in the store will descend more quickly, forming a funnel shaped depression in the surface of the material. The bulk material at the periphery will fall into the funnel shaped depression so that the strata will be intermixed, no uniform descent being provided.

In another form of prior art device, the bulk material is stored in a silo having walls that are inclined upwardly, with a horizontally traversable screw conveyor mounted at the bottom of the silo. Even descent of the material over the cross-section of the silo is not achieved since near the discharge end of the screw its threads will be completely filled with material that has entered the screw at the fore end of the screw. Material at the fore end of the screw will thus descend more quickly than at the discharge end, again resulting in non-uniform descent and intermixing of strata.

According to the present invention, a device for discharging bulk material from a store is provided that provides for uniform descent of the bulk material from the store, no intermixing of layers taking place. Such a device includes a rotary screw conveyor rotatable about a longitudinal axis and surrounded by an elongated drum which is rotatable independently of the screw conveyor and which is provided with inlet apertures distributed over the periphery and along the length of the cylindrical face of the drum. Means are provided for mounting the rotary screw conveyor and drum for movement in a straight path perpendicular to the longitudinal axis of the rotary screw, and means are provided for powering the conveyor and drum in that longitudinal path. Further, means for effecting rotation of the rotary screw conveyor in the drum are provided so that the drum apertures during the combined rotation and linear displacement thereof dig into the layer of bulk material and transfer the material into the drum to be displaced by the screw conveyor so that the desired uniform descent of the bulk material from the store takes place. The inlet apertures may be shaped as axially or obliquely extending slits, with slits situated in the same cross-section of the drum equally spaced in the peripheral direction, and with at least one inlet aperture in each cross-section of the drum except at its outermost ends.

During long periods of non-use of the discharging device, a detrimental deflection of the drum may take place due to the settling and compaction of the bulk material. The drum, which usually "floats" in the bulk material during normal operation, does not do so during long stand-stills since the material does not engulf the undersurface of the drum. Without bulk material on the undersurface of the drum transmitting pressure thereto, the pressure of the bulk material above the drum causes excessive deflection thereof; this deflection may result in binding of the drum so that it will not properly rotate when start-up is attempted, resulting in damage thereto. Additionally, too great a deflection may permanently warp the drum.

According to the present invention, means are provided for preventing detrimental deflection of the drum during long periods of non-use due to settling and compaction of the bulk material, while not interferring with movement of the drum in its straight line path during use, and facilitating rotation of the drum during start-up after a long period of non-use. Such detrimental deflection preventing means preferably comprise a metal rail mounted in the floor over which the drum and conveyor move, and generally extending in said straight path, with a top surface substantially flush with the floor. A block of low friction material (such as a high-molecular plastic material like Teflon) is operatively connected to the rail, extending along the entire upper surface thereof, and upstanding therefrom a distance less than the spacing of the drum from the floor during rotation of the drum. A single rail and block preferably are provided located adjacent the axial midpoint of the drum and extending perpendicular to the direction of elongation of the drum so that the drum makes line contact with the block when deflected into contact therewith over long periods of non-use.

Additionally, according to the present invention means are provided for counteracting any tendency of the bulk material to wedge in the spacing between the drum and the block, thereby lifting the drum. Such counteracting means preferably comprises a helical strip of steel having a total axial dimension at least as great as the width of the block, with means for mounting the strip on the drum so that a part of the strip always lies closely above the block and during rotation of the drum an edge of the strip sweeps bulk material sideways off the block. When the drum includes eyelids formed bordering at least some of the inlet apertures extending radially outwardly from the drum, the strip is dimensioned so that it is at least as thick as the distance the eyelids radially outwardly extend from the drum. The apertures are preferably rhomboid in shape and have centers equidistantly located on one or more helical lines extending parallel to the helical strip with the strips spaced from the apertures. In a preferred embodiment, a lowermost portion of the strip is vertically spaced from an uppermost surface of the block a distance of about 50 mm during rotation of the drum.

It is the primary of the present invention to provide a device for effecting uniform descent of bulk material from a store, without detrimental effect after long periods of non-use. This and other objects of the invention will become clear from an inspection of the detailed description of the invention, and from the appended claims.

BRIEF DESCRIPTION OF THE DRAWINGS

FIG. 6 is a view like FIG. 1 illustrating exemplary means for preventing detrimental deflection of the drum of the device of FIG. 1;

FIG. 7 is a detailed elevational view of the central part of the drum and floor in FIG. 6;

FIG. 8 is a cross-sectional view of the device of FIG. 7 taken along lines VIII—VIII thereof;

FIG. 9 is a partial side view of a modified form of the discharge device drum according to the present invention.

FIG. 10 is a plan view of an apertured flat steel plate from which the drum of FIG. 9 is formed by rolling and connecting its longitudinal edges together by a welded seam;

FIG. 11 is an enlarged view of an exemplary aperture in the drum of FIG. 9; and

FIG. 12 is a cross-sectional view taken along lines XII—XII of FIG. 11.

DETAILED DESCRIPTION OF THE DRAWINGS

Figure 1:
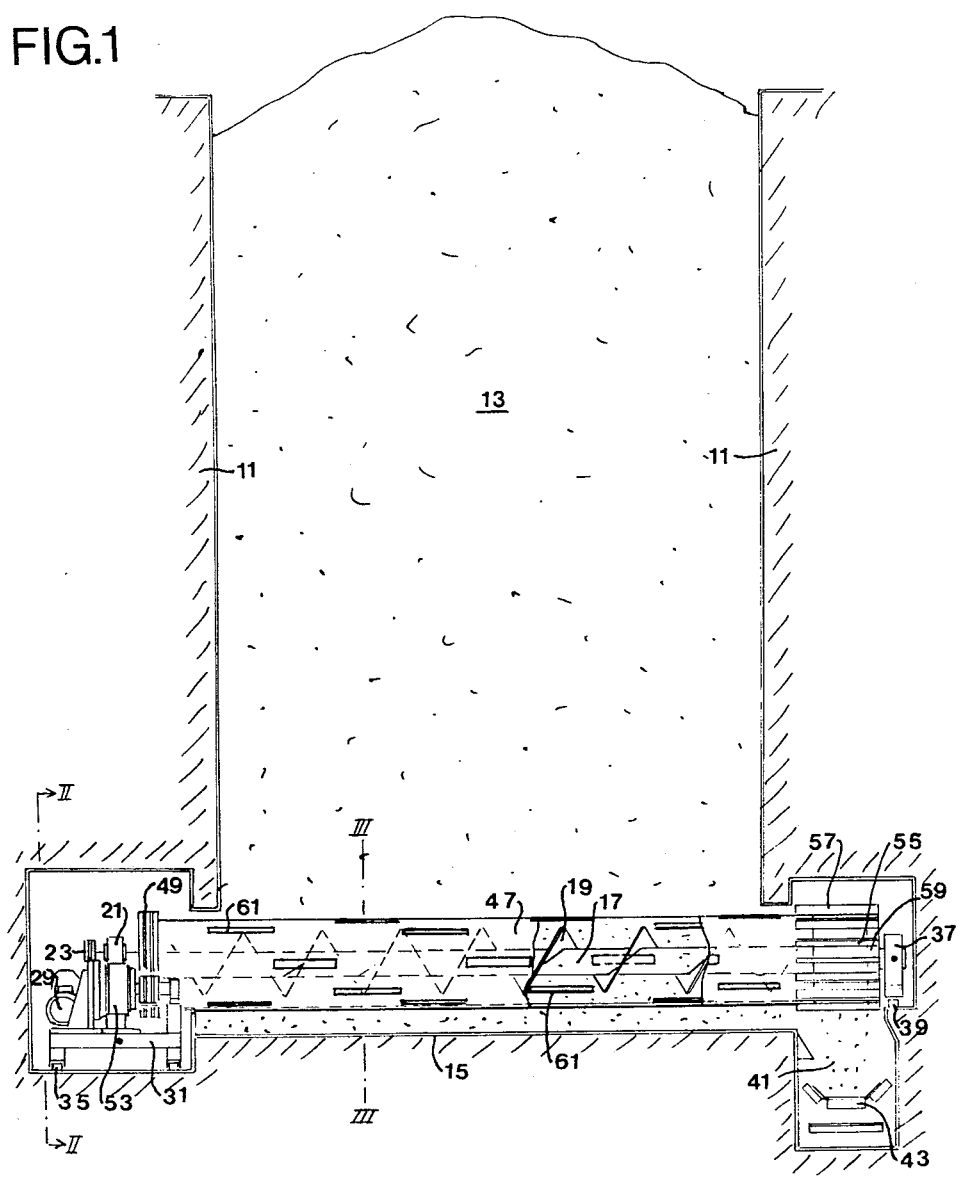
FIG. 1 is a vertical cross-sectional view of a silo storing bulk material and having at its base an exemplary discharging device according to the present invention, the discharging device being illustrated partly in elevation and partly in cross-section.
Figure 3:
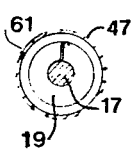
FIG. 3 is a cross-sectional view taken along lines III—III of FIG. 1.

An exemplary device according to the present invention is illustrated schematically in FIG. 1 in association with a silo having vertical walls 11, and for defining a store of bulk material 13, the bulk material 13 being wood chips, sand, corn, or the like. The silo includes a base or floor 15 with a horizontal screw conveyor including a shaft 17 and a screw blade 19 attached thereto (forming a continuous helical face of a constant pitch) disposed over the floor. One end of shaft 17 is journalled in a bearing 21 and carries a chain wheel coupled to an electric driving motor 29 by a chain 25 and worm gear 27 or the like. The bearing 21 and the drive motor 29 are mounted on a carriage 31 which is capable of moving along a horizontal track 35 on shoes 33, wheels, or the like. That horizontal track 35 extends in a duct at the side of the silo and runs the entire length of the silo. The opposite end of the shaft 17 is journalled in a bearing 37 running in a track 39 parallel to the track 35 and located on a ledge above a horizontal duct 41, opposite the duct in which the track 35 is disposed. The duct 41 also houses a belt conveyor 43 or the like disposed beneath the end of the screw conveyor, the screw conveyor 17, 19 discharging bulk material from the silo onto the conveyor 43 after which it is subsequently carried away by the conveyor 43.

The carriage is moveable back and forth along the track 35 under the influence of wires 45 connected to a motor driven winch. Corresponding wires are attached to the bearing 37 to displace it in unison with the carriage 31 so that the shaft 17 is maintained in correct alignment. Other synchronous drive mechanisms can be utilized, such as a rack and pinion arrangement, etc. The screw conveyor is surrounded by an elongated cylindrical drum 47 extending the entire width of the silo, and the ends of which project into the ducts receiving the tracks 35, 37 and conveyor 43. The drum 47 is concentric with the shaft 17 and its outermost ends are supported by the shaft 17, the screw conveyor and drum being rotatable about a longitudinal axis. The tracks 37, 39 carriage 31 and the like mount the screw conveyor 17, 19 and drum 47 for movement in a straight line path perpendicular to the longitudinal axis about which the rotary screw conveyor and drum are rotatable, with the wires 45 and the winch to which they are connected providing means for powering the conveyor and drum in the straight line path. Additionally means are provided for effecting rotation of the rotary screw conveyor and drum so that inlet apertures 61 of the drum, during the combined rotation and linear displacement of the drum 47, dig into a layer of the bulk material and transfer the material into the drum to be displaced by the screw conveyor to effect uniform descent of the bulk material from the store. The drum is rotatable independently of the screw conveyor. One end of the drum has a chain wheel 49 which, by means of the chain 51, is coupled to a hydraulic motor 53 placed upon the carriage 31, the motor 53 rotating the drum 47 independently of, and considerably slower than (and usually in opposite direction to) the screw conveyor 17, 19. At its opposite, undriven end, the drum 47 has an outlet formed by slots 55 between axially directed laths 57 connecting the end of the drum to an end disk 59 which is journalled on the shaft 17.

The inlet apertures 61 have the shape of axially directed slits cut in the drum 47, which apertures 61 are distributed over the entire (or substantially the entire) length of the drum extending between the walls 11, and also distributed around the circumference thereof. The slits are relatively large and perform a loosening and digging function with respect to the bulk material 13, and are axially overlapped with at least one inlet aperture 61 being provided in each cross-section of the drum (except for its outermost ends). Where several inlet apertures are provided in a cross-section of the drum, they preferably are evenly spaced around the circumference thereof. Where slits overlap it is important to place them at a sufficient peripheral interval so as not to weaken the drum. The slits may be of substantially the same size and configuration as each other, the dimensions thereof being chosen with regard to the size of the particles to pass therethrough.

Alternatively the inlet apertures may have the shape of obliquely directed slits 61' as illustrated in FIG. 9, or may have the shape of rhombiods 61" (see FIG. 7) having centers equidistantly located on one or more helical lines.

Figure 2:
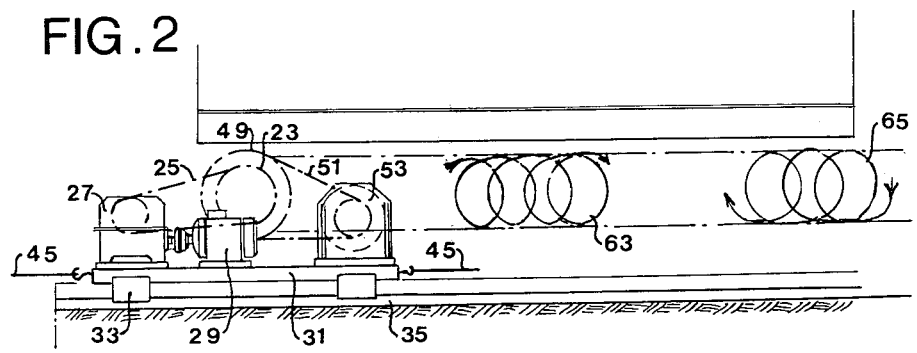
FIG. 2 is a side view taken along lines II—II of FIG. 1.

As previously mentioned, the means for effecting rotation of the rotary screw conveyor and the drum, in combination with the linear movement of the drum, are provided so that uniform descent of the bulk material 13 from the store is effected. When the carriage 31 is moved slowly along its track 35 and the drum 47 is rotated by motor 53, each of the inlet slits 61 (61', 61") describes a trochoidal path through a horizontal layer of the bulk material. For one direction of movement of the carriage, a part of the path is indicated by the curve 63 in FIG. 2, and when the carriage is moved in the opposite direction the path is indicated by the curve 65.

During the combined motion of rotation and lateral displacement of the bulk material particles, the particles are pushed through the slits 61 of the drum, with the edges of the slits 61 performing a digging operation to loosen and separate particles from the bulk material efficiently to enable them to pass into the drum 47. The conveyor screw is driven at such a speed that the material entering the drum does not fill up the drum more than a fraction of the cross-section (e.g., half thereof at most) so that when the slits 61 assume a position at the upper half of the drum 47 (where the rate of passage of material through the slits is at a maximum) the introduction of the particles into the drum 47 is not hindered by material previously introduced into the drum, but rather drops easily through the slits 61 regardless of their location along the length of the drum.

The drum takes the pressure of the weight of the material 13 overlying it, and due to its rigidity resists this pressure without substantial deflection during short periods of non-use. This means that the screw conveyor does not take this weight and thus the shaft 17 may thus have a relatively small diameter, and the screw conveyor can be driven rapidly with low power consumption since it merely conveys the material in the drum towards the outlet and does not perform any futile agitation of the material. [Of course such agitation of the material may result in damage to the particles.]

Figure 5:
FIG. 5 is a cross-sectional view taken along lines V—V of FIG. 4.
Figure 4:
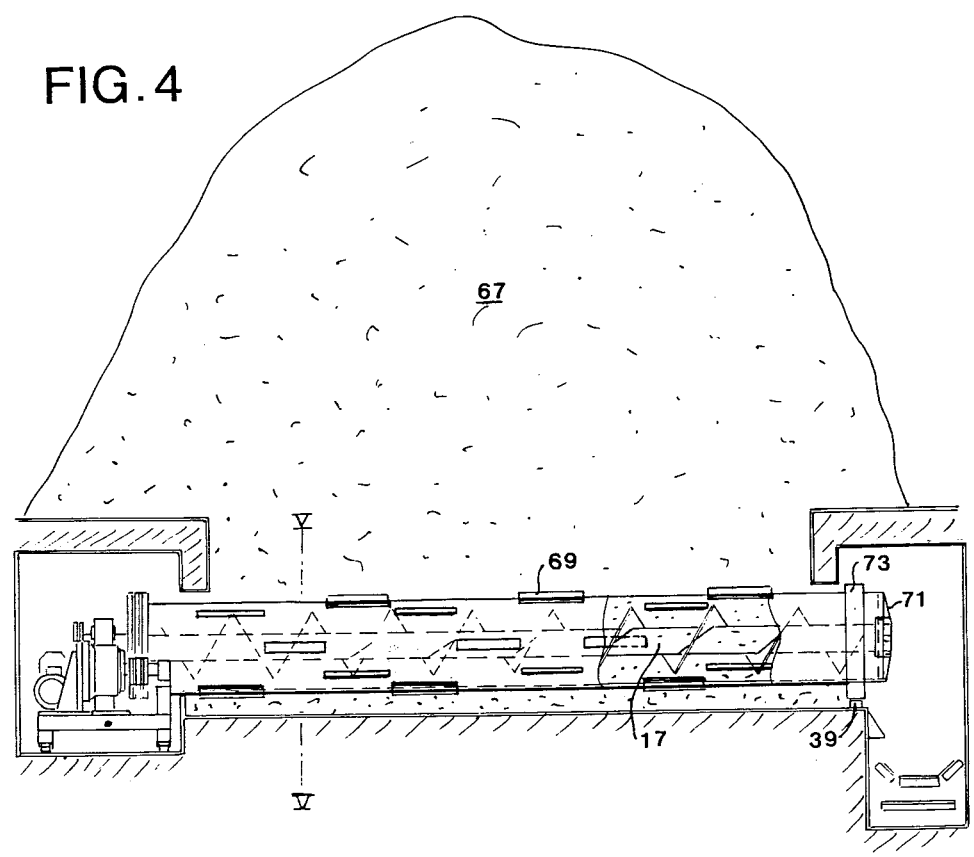
FIG. 4 is a view like FIG. 1 of an exemplary modified embodiment of the discharging device according to the present invention placed below an open store of bulk material.

The embodiment illustrated in FIGS. 4 and 5 also functions to withdraw bulk material from the bottom layer of a store, in this case an open store. Because of the nonuniform nature of the store itself, the uniform descent achieved according to the invention is at the central portions of the store (not at its sloping sides).

In the modifications of FIGS. 4 and 5 eyelids 69 are provided adjacent to inlet apertures 61, or the like. During rotation the eyelids 69, which extend radially outwardly from the drum 47, rake bulk material through the slits into the drum. The eyelid 69 may be formed by bending out the sheet material of the drum along one longitudinal edge of each slit 61.

In the FIGS. 4 and 5 embodiment, the outlet end of the drum is either open or terminates with an apertured head 71 through which the discharged material leaves the drum 47. The drum is supported by an exterior bearing 73 which runs on the track 39, and the shaft 17 of the screw conveyor is journalled in the head 71.

While the discharging device in FIGS. 1 through 5 operates effectively, when it is inactive for long periods of time there is a tendency for detrimental deflection of the drum 47 to take place, particularly at the axial midpoint thereof. In order to prevent this detrimental deflection and consequent damage to the drum, while not interferring with movement of the drum in its straight line path during use, and facilitating rotation of the drum during start-up after a long period of non-use, a rail 86 or the like is provided. The rail 86 is preferably formed of metal, and is anchored in the floor 15 by rods or bolts 88 or the like, and extends generally along the straight line path, and preferably perpendicular to the longitudinal axis of rotation of the drum 47. As seen in FIG. 7, the top of the rail 86 is substantially flush with the floor 15, the drum 47 normally being spaced from the floor 15 a predetermined distance. A block 90 of low friction material (such as a high-molecular plastic material like Teflon) is operatively connected to the rail and upstands therefrom a distance less than the normal spacing of the drum 47 from the floor 15 during rotation of the drum (see FIG. 7). During long periods of non-use, the center of the drum 47 will be deflected into engagement with the block 90. When rotation of the drum is initiated again, however, the only friction that need be overcome is the friction between the drum and the low friction block 90 along a contact line.

Preferably means are also provided for counteracting any tendency of the bulk material to wedge into the narrow space between the drum 47 and the block 90. Such wedging would have a tendency to lift the drum. Such counteracting means preferably comprises an external circumferential ridge, such as a helical strip 92 of rigid material (e.g., iron) wound at least one revolution around the drum 47 and attached thereto by welding or the like. The total axial dimension along the drum of the strip 92 is at least as great as the width of the block 90 (see FIG. 7), and means are provided (e.g., welding ) for mounting the strip at the location along the drum 47 illustrated in FIG. 7, so that a part of the strip always lies closely above the block 90 and during rotation of the drum 47 an edge of the strip sweeps bulk material sideways off the block 90.

When the drum 47 includes eyelids 69 (see FIG. 8) bordering at least some of the inlet apertures 61", this strip 92 is dimensioned so that it is at least as thick as the distance the eyelid 69 radially outwardly extends from the drum 47, as illustrated in FIG. 8. In a preferred embodiment, a lowermost portion of the strip 92 is vertically spaced from an uppermost portion of the block 90 a distance of about 50 mm during rotation of the drum 47. As illustrated in FIG. 7, the centers of the rhomboid shaped opening 61" are equidistantly located on one or more helical lines extending parallel to the strip 92, with the strip 92 spaced from the apertures 61".

When the drum 47 is a length of about 20 meter, and the diameter of about 1 meter, difficulties may arise due to the deflection of the conveyor, screw shaft or the drum. Therefore, it is preferably to center the shaft 17 in the drum 47 at one or more place by utilizing a bearing 93 (see FIG. 8) interconnected to the drum 47 by a plurality of radially extending arms 94. The bearing means 93 are disposed on the shaft 17 at a discontinuity of the screw 19. The radially extending arms each make a positive angle alpha (e.g., about 15° to 50°) with respect to a plane perpendicular to the shaft 17, and the radial arms apply an axial force to the bulk material being fed past the discontinuity in the screw 19 upon relative rotation between the screw 19 and the drum 47. Such bearing and arm means are more fully disclosed in copending application Ser. No. 960,721 filed Nov. 14, 1978, the disclosure of which is hereby incorporated by reference herein.

FIGS. 10, 11 and 12 show details of construction of a manufactured discharging drum pertaining to a wood chips silo.

The drum has a length of 11,390 mm and a diameter of 609 mm. The apertures 61 are bordered by a 325 mm long straight edge extending in the longitudinal direction of the drum, two parallel 125 mm long straight edges at right angles thereto and a fourth curved edge with a radius av 250 mm. All four corners are smoothly curved. An eyelid 69 is attached by welding to the first-mentioned edge. There are 39 apertures distributed over the drum according to the pattern of FIG. 10. In the peripheral direction the apertures are spaced 135 degrees, and in the axial direction their centers are spaced somewhat less than their length direction, so that there is a small overlap, as indicated by the lines 101, 103. It is important that the stored wood chips material is being activated evenly over any portion of the whole length of the drum extending between the walls 11 of the silo (FIG. 1), and said overlap serves to compensate for the reduced admittance through the end portions of the apertures. The apertures are located along a single helix 105, but they can also be said to be located along three parallel helices 107, 109, 111. With the shown distribution of the apertures they will cause the least possible weakening of the strength of the drum.

Various modifications of the structures described above can be made within the scope of the present invention. For instance, the drive of the shaft 17 can be a hydraulic motor placed on a carriage running on the track 35 with the drive of the drum 47 by another hydraulic motor placed on a carriage running on the track 39. The carriages may also have mutually independent means for moving the conveyor along the tracks such as hydraulic rams and alternately operated clutches. With driving mechanisms on the opposite ends of the screw and drum, the hydraulic motors may be hydraulic motors concentric with the drum and screw. Also, with the drum supported separately from the screw, the screw may be placed eccentrically therein. Additionally, if the floor 15 slopes, the drum and the conveyor screw may also be set at an inclination of a smaller or greater angle to a horizontal plane.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A device for discharging bulk material from a store thereof, comprising: a rotary screw conveyor rotatable about a longitudinal axis, and surrounded by an elongated drum which is rotatable independently of the screw conveyor; means providing inlet apertures distributed over the periphery and along the length of the cylindrical face of said drum; means for mounting said rotary screw conveyor and drum for movement over a floor in a straight path perpendicular to said longitudinal axis with said drum spaced a predetermined distance from the floor; means for powering said conveyor and said drum in said straight path; means for effecting rotation of said rotary screw conveyor and said drum; and means for preventing detrimental deflection of said drum during long periods of non-use due to settling and compaction of the bulk material, while not interferring with the rotation of and movement of said drum in said straight line path during use, and facilitating rotation of said drum during start-up after a long period of non-use, said means comprising a strip of material disposed on the floor and extending generally in said straight line path, and having an upper surface, said upper surface upstanding from the foor a distance less than the spacing of the drum from the floor during rotation of the drum.

2. A device for discharging bulk material from a store thereof, comprising: a rotary screw conveyor rotatable about a longitudinal axis, and surrounded by an elongated drum which is rotatable independently of the screw conveyor; means providing inlet apertures distributed over the periphery and along the length of the cylindrical face of said drum; means for mounting said rotary screw conveyor and drum for movement over a floor in a straight path perpendicular to said longitudinal axis with said drum spaced a predetermined distance from the floor; means for powering said conveyor and said drum in said straight path; means for effecting rotation of said rotary screw conveyor and said drum; and means for preventing detrimental deflection of said drum during long periods of non-use due to settling and compaction of the bulk material, while not interferring with movement of said drum in said straight line path during use, and facilitating rotation of said drum during start-up after a long period of non-use, means comprising a rail mounted in the floor generally extending in said straight line path and having a top surface substantially flush with the floor, and a block of low-friction material operatively connected to said rail and upstanding therefrom a distance less than the spacing of said drum from the floor during rotation of said drum.

3. A device as recited in claim 2 wherein said block comprises a high-molecular plastic material.

4. A device as recited in claim 2 wherein a single rail and block are provided located adjacent the axial midpoint of the drum said rail and said block extend perpendicular to the direction of elongation of said drum, said drum making line contact with said block when deflected into contact therewith over long periods of non-use.

5. A device as recited in claim 4 further comprising means for counteracting any tendency of the bulk material to wedge into the spacing between said drum and said block.

6. A device as recited in claim 5 wherein said counteracting means comprises a helical strip of rigid material having a total axial dimension at least as great as the width of said block, and means for mounting said strip on said drum so that a part of said strip always lies closely above said block and during rotation of said drum an edge of said strip sweeps bulk material sideways off said block.

7. A device as recited in claim 2 further comprising means for counteracting any tendency of the bulk material to wedge into the spacing between said drum and said block.

8. A device as recited in claim 7 wherein said counteracting means comprises a helical strip of rigid material having a total axial dimension at least as great as the width of said block, and means for mounting said strip on said drum so that a part of said strip always lies closely above said block and during rotation of said drum an edge of said strip sweeps bulk material sideways off said block.

9. A device as recited in claim 8 wherein said drum includes eyelids formed bordering at least some of said inlet apertures, extending radially outwardly from said drum, and wherein said strip is at least as thick as the distance said eyelids radially outwardly extend from said drum.

10. A device as recited in claim 8 wherein said apertures are rhomboid in shape and have centers equidistantly located on one or more helical lines extending parallel to said helical strip of rigid material, with said strip spaced from said apertures.

11. A device as recited in claim 8 wherein a lowermost portion of said strip is vertically spaced from an uppermost surface of said block a distance of about 50 mm during rotation of said drum.

12. A device for discharging bulk material from a store thereof comprising: a rotary screw conveyor surrounded by an elongated drum which is rotatable independently of the screw conveyor and which is provided with inlet apertures distributed over the periphery and along the length of the cylindrical face of the drum; means for mounting said rotary screw conveyor and drum for movement in a straight line path perpendicular to said longitudinal axis with said drum spaced a predetermined distance from the floor and further comprising: means for powering the conveyor and drum in said path; and means for effecting rotation of said rotary screw conveyor and drum so that said drum apertures, during the combined rotation and linear displacement of the drum, dig into a layer of the bulk material and transfer the material into the drum to be displaced by the screw conveyor to effect uniform descent of the bulk material from the store; and means for preventing detrimental deflection of said drum during long periods of non-use due to settling and compaction of the bulk material, while not interfereing with movement of said drum in said straight line path during use, and facilitating rotation of said drum during start-up after a long period of non-use, said means comprising a rail mounted in the floor generally extending in said straight line path and having a top surface substantially flush with the floor, and a block of low-friction material operatively connected to said rail and upstanding therefrom a distance less than the spacing of said drum from the floor during rotation of said drum.

13. A device according to claim 12 wherein the inlet apertures are shaped as obliquely extending slits.

14. A device according to claim 12 wherein said means for effecting rotation of said rotary screw conveyor and said drum comprise a pair of drive motors disposed upon a carriage which is displaceable in said path along with said conveyor and drum.

15. A device according to claim 12 wherein the inlet apertures are shaped as axially extending slits.

16. A device according to claim 15 wherein inlet apertures situated in the same cross-section of the drum are equally spaced in the peripheral direction.

17. A device according to claim 12 wherein there is at least one inlet aperture in each cross-section of the drum except for its outermost ends, the apertures being axially overlapping.

18. A device according to claim 12 wherein one end of the drum is supported by an exterior bearing which is displaceably supported upon a fixed bedding.

19. A device according to claim 18 wherein one end of the shaft of the conveyor screw is journalled in a head of the drum.

20. A device according to claim 12 wherein the drum is journalled at both ends upon the shaft of the conveyor screw.

21. A device according to claim 20 wherein the drum has an outlet at one end, which is situated inwardly of its bearing upon the shaft of the screw conveyor.

22. A device as recited in claim 12 wherein said block comprises a high-molecular plastic material.

23. A device as recited in claim 12 wherein a single rail and block are provided located adjacent the axial midpoint of the drum said rail and said block extend perpendicular to the direction of elongation of said drum, said drum making line contact with said block when deflected into contact therewith over long periods of non-use.

24. A device as recited in claim 12 further comprising means for counteracting any tendency of the bulk material to wedge into the spacing between said drum and said block.

25. A device as recited in claim 24 wherein said counteracting means comprises a helical strip of rigid material having a total axial dimension at least as great as the width of said block, and means for mounting said strip on said drum so that a part of said strip always lies closely above said block and during rotation of said drum an edge of said strip sweeps bulk material sideways off said block.

26. A device as recited in claim 25 wherein said drum includes eyelids formed bordering at least some of said inlet apertures, extending radially outwardly from said drum, and wherein said strip is at least as thick as the distance said eyelids radially outwardly extend from said drum.

27. A device for discharging bulk material from a store thereof comprising: a rotary screw conveyor surrounded by an elongated drum which is rotatable independently of the screw conveyor and which is provided with inlet apertures distributed over the periphery and along the length of the cylindrical face of the drum; means for mounting said rotary screw conveyor and drum for movement in the straight line path perpendicular to said longitudinal axis with said drum spaced a predetermined distance from the floor; means for powering the conveyor and drum in said path; and means for effecting rotation of said rotary screw conveyor and drum so that said drum apertures, during the combined rotation and linear displacement of the drum, dig into a layer of the bulk material and transfer the material into the drum to be displaced by the screw conveyor to effect uniform descent of the bulk material from the store; and means for preventing detrimental deflection of said drum during long periods of non-use due to settling and compaction of the bulk material, while not interfereing with movement of said drum in said straight line path during use, and facilitating rotation of said drum during start-up after a long period of non-use, said means comprising a strip of material disposed on the floor and extending generally in said straight line path, and having an upper surface, the upper surface of the strip upstanding from the floor a distance less than the spacing of the drum from the floor during rotation of the drum.

28. A device as recited in claims 1 or 27 wherein at least said upper surface of said strip is of low-friction material.

* * * * *